(No Model.) 2 Sheets—Sheet 1.

J. F. McELROY.
AUTOMATIC SWITCH.

No. 554,080. Patented Feb. 4, 1896.

Witnesses
A. L. Kobber
M. B. O'Dogherty

Inventor
James F. McElroy
By Thos. S. Magner Son
Attys.

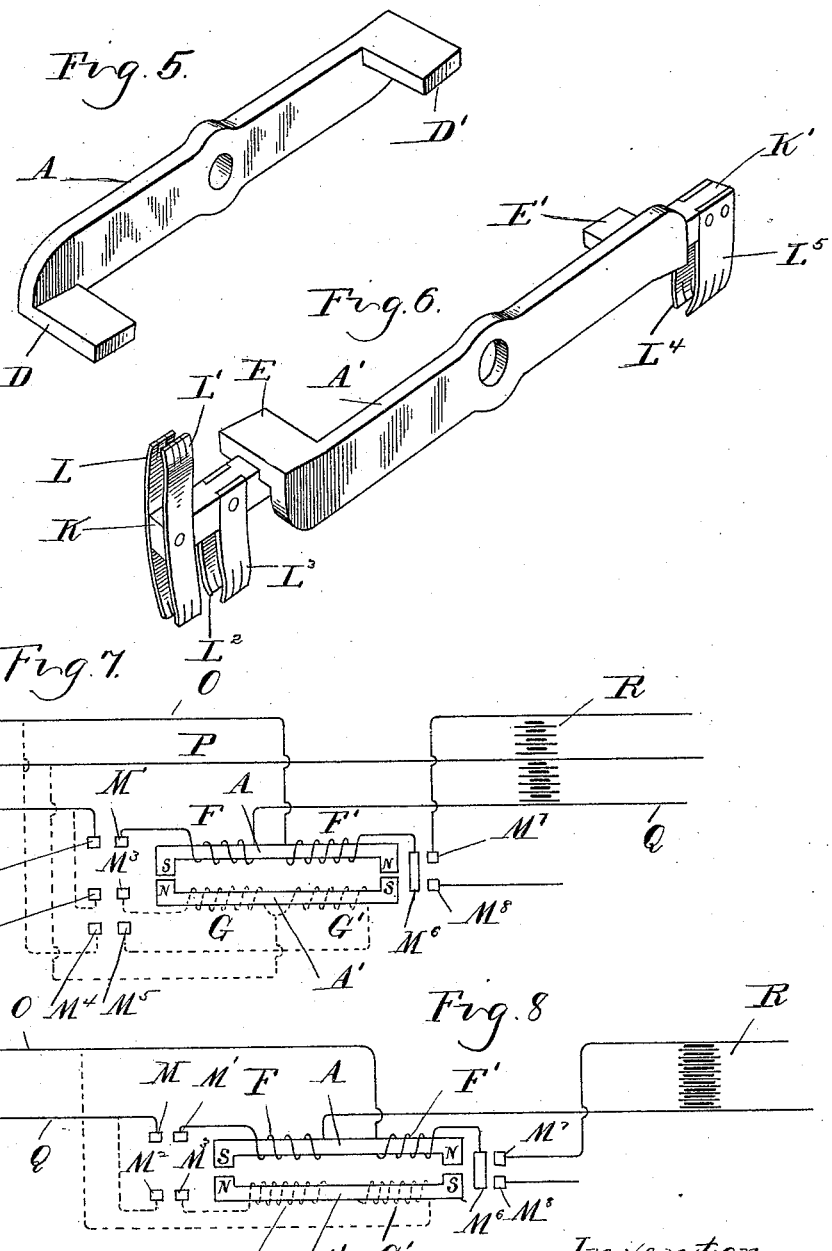

UNITED STATES PATENT OFFICE.

JAMES F. McELROY, OF ALBANY, NEW YORK, ASSIGNOR TO THE CONSOLIDATED CAR HEATING COMPANY, OF SAME PLACE.

AUTOMATIC SWITCH.

SPECIFICATION forming part of Letters Patent No. 554,080, dated February 4, 1896.

Application filed January 2, 1892. Serial No. 416,802. (No model.)

*To all whom it may concern:*

Be it known that I, JAMES F. McELROY, a citizen of the United States, residing at Albany, in the county of Albany and State of New York, have invented certain new and useful Improvements in Automatic Switches, of which the following is a specification, reference being had therein to the accompanying drawings.

This invention relates to new and useful improvements in automatic switches for charging storage-batteries.

In the most preferred systems of lighting cars by electricity storage-batteries are used in connection with a generator operated by the motion of the train. These storage-batteries are charged by the generator when the train is running, and automatic switches have to be used between the generator and storage battery or batteries in circuit therewith to disconnect the generator from the batteries when on account of the stoppages or slowing down of the train or for other reasons the generator ceases to work or fails to develop a current of the required strength. My improved switch is designed for this purpose and operates to automatically connect and disconnect the generator and storage-batteries as required for the proper operation of the lighting plant.

My invention consists in the peculiar construction, arrangement and operation of an automatically-operating switch embodying a tilting and a fixed armature-bar, each provided with two electromagnets in circuits respectively with the main circuit and shunt-circuit of the dynamo, and the required number of fixed and movable contacts operated by the tilting armature-bar, all as more fully hereinafter described, and shown in the accompanying drawings, in which—

Figure 1:
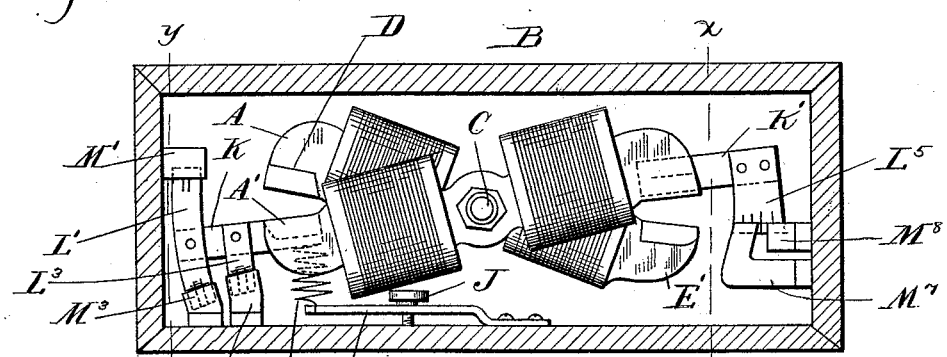
Figure 2:
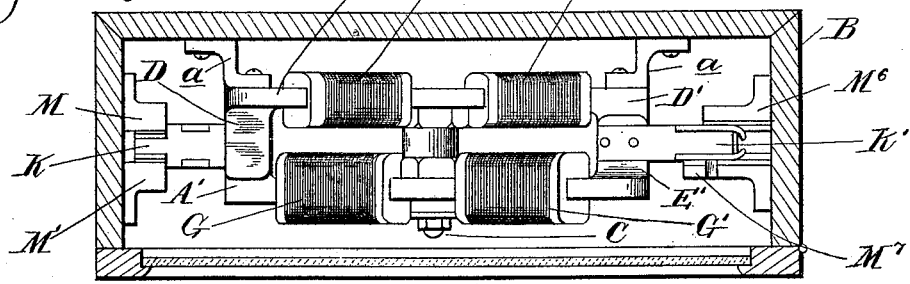
Figure 3:
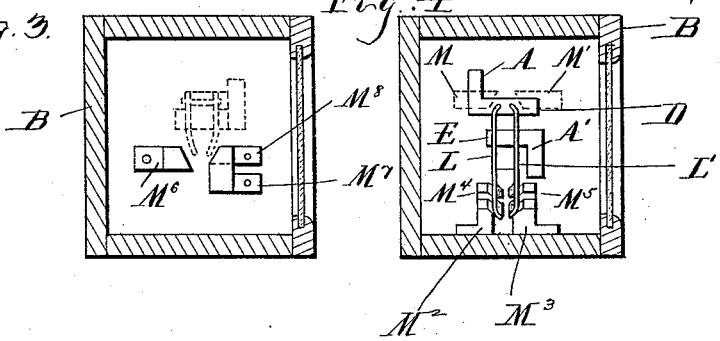
Figure 4:
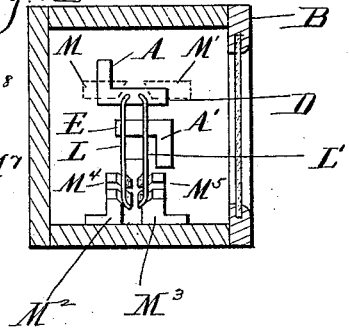

Figure 1 is a side elevation of my improved switch. Fig. 2 is a plan view thereof. Figs. 3 and 4 are cross-sections on lines $x\,x$ and $y\,y$, respectively, to show the contacts. Figs. 5 and 6 are detached perspective views of the two armature-bars. Figs. 7 and 8 are diagrams showing the application of my switch to two systems of charging storage-batteries, one with a two-wire and the other with a three-wire system.

A A' are two like armature-bars inclosed within an outer casing, B. The armature-bar A is fixed to the side of the casing by the angle-plates $a$ or fixedly secured in position in any other suitable way. The armature-bar A' is free to tilt upon a pivot-pin C secured to the fixed armature-bar. Each of the two bars is provided at the end with laterally-projecting pole-pieces D D' and E E', which project into the path of each other and are adapted to come in contact with each other by the tilting of the armature-bar A'

Each of the armature-bars is provided with a pair of electromagnets, the magnets F F' of the bar A being connected in the charging-circuit with the battery and the magnets G G' of the bar A' in the shunt-circuit of the dynamo, as appears in Figs. 7 and 8 and to which further reference will be made.

A potential-spring H is secured to one end of the armature-bar A', and this is provided with tensioning devices, such as a spring-bar I and thumb-screw J.

To the free end of the tilting armature-bar are secured by insulating-arms the movable contacts, and the fixed contacts are placed in suitable relation thereto to close the main circuit of the dynamo and open the shunt-circuit when the poles of the two armature-bars are in contact, and close the shunt-circuit and open the main circuit when the tilting armature-bar is drawn away. The arrangement of these contacts may be obviously varied and their number depends upon the number of contacts to be opened or closed. The arrangement, as shown in the drawings, is as follows: Insulating-arms K K' are secured to the ends of the tilting armature-bar, and two pairs of contact springs or jacks L L' $L^2 L^3$ are secured to the arm K, and one pair of contact-springs, $L^4 L^5$, are secured to the arm K'. The contact-springs L L' extend above and below the arm K, and the contact-springs $L^2 L^3$ and $L^4 L^5$ extend only below the contact-arms. The contact-springs have their free ends bent inwardly to form wedge-shaped jacks, and they operate in connection with fixed contacts or jacks correspondingly wedge-shaped. Moreover, the free ends of the contact-springs are divided to make them more elastic.

The contact-springs L L' are adapted to contact with the fixed contacts M M' and M² M³, placed, respectively, above and below, and the contact-springs L² L³ are adapted to contact with the fixed contacts M⁴ M⁵ placed below the springs.

The contact-springs L⁴ L⁵ are adapted to contact with the three fixed contacts M⁶ M⁷ M⁸, placed below the contact-springs.

In operation, the parts being arranged as shown and described, the current is distributed through three main conductors, O P Q, the current in one direction passing out on the conductor O and returning on the conductor P, while the current in the other direction passes out over wire P and returns over wire Q. The current is thus intermittent in the conductors O Q, and to and fro in the conductor P, O P being the circuit for the current flowing in one direction and P Q for the current flowing in the opposite or other direction in wire P. The storage-battery R is thus charged by being coupled in halves between the three conductors, one phase of the current charging one half and the other phase charging the other half. The coil F is connected with the conductor Q, which is closed through the fixed contacts M M'. The coil F' is connected up with conductor O, which is closed through the fixed contacts M⁶ M⁷. The coils G and G' are connected up to two separate branches of the shunt-circuit, which connects the conductor P with both conductors O and Q, the connection being such that as the current moves in one direction (when the contacts are closed) it passes through one of the coils, and as it moves in the opposite direction it passes through the other coil, making one pole of the armature a north and the other a south pole. This shunt-circuit is closed through the contacts M² M³ M⁴ M⁵.

With the connections arranged as described, the switch, when no current is flowing, or when the current is not up to its required strength, is in the position shown in Fig. 1. In this position the circuit from the dynamo to the battery is open and the shunt-circuit of the dynamo is closed. The field-magnet circuit of the dynamo is also open. In this position of the switch all the current generated passes through the shunt, and the coils G G' are alternately energized by the current-waves which in one direction pass through one and in the next direction pass through the other, making one pole of the armature a north and the other a south pole. Now if the current increases up to the required strength, the potential-spring H being so adjusted as to be now overcome by the magnetic attraction of the poles E E' upon the poles D D' of the armature A, (which is, however, not magnetic at this time,) the armature-bar A' will tilt until its poles E E' come in contact with the poles D D'. This reverses the connections, the circuit from the dynamo to the storage-battery is instantly closed and the shunt-circuit of the dynamo is opened. At the same time the coils F F' are thrown into circuit and the coils G G' cut out of circuit. It is now the armature A which is magnetized and by its attraction holds the armature A' in position until the current drops below its required strength, as by diminution of the speed of the train or by the counter electromotive force of the battery when it becomes charged, or for any other reason, when the spring H will again reverse the connection by drawing the armature A' away from the armature A. The peculiar features of the two armatures are, therefore, that they alternately become magnetized.

In applying my switch to the ordinary two-wire system of distribution, as shown in Fig. 8, the contact-springs L² L³ and contacts M⁴ and M⁵ may be dispensed with, as they are not needed. It may be, however, remarked that as the current flows continuously in the two-wire system, the coils G G' and E E' need not be wound as much as when the switch is used in connection with three wires where the current is intermittent, and where, therefore, one of the two magnets alternately has to develop enough strength to operate the switch.

I am aware that many minor changes in the construction and arrangement of the parts of the device can be made and substituted for those herein shown and described without in the least departing from the nature and principle of my invention.

What I claim as my invention is—

In an automatic switch, the combination with two armature-bars, a central pivotal connection between the bars and means for fixedly securing one of the bars, of coils on both bars, laterally-extending armatures on the opposite ends of the bars, those adjacent arranged to act upon each other, fixed contacts and contacts carried by the opposite ends of the movable bar, substantially as described.

In testimony whereof I affix my signature in presence of two witnesses.

JAMES F. McELROY.

Witnesses:
GEO. A. GREGG,
EDWIN A. SMITH.